United States Patent [19]

Zimmer et al.

[11] Patent Number: 4,710,093

[45] Date of Patent: Dec. 1, 1987

[54] DEVICE FOR THE AUTOMATIC GRIPPING AND RELEASING OF A TOOL HOLDER IN A MANIPULATOR

[75] Inventors: Ernst Zimmer, Friedberg; Botho Kikut, Augsburg, both of Fed. Rep. of Germany

[73] Assignee: KUKA Schweissanlagen & Roboter GmbH, Fed. Rep. of Germany

[21] Appl. No.: 832,712

[22] PCT Filed: Jun. 4, 1985

[86] PCT No.: PCT/EP85/00265

§ 371 Date: Feb. 7, 1986

§ 102(e) Date: Feb. 7, 1986

[87] PCT Pub. No.: WO86/00040

PCT Pub. Date: Jan. 3, 1986

[30] Foreign Application Priority Data

Jun. 8, 1984 [DE] Fed. Rep. of Germany ....... 3421452

[51] Int. Cl.⁴ ............................................ B25J 11/00
[52] U.S. Cl. ...................................... 414/730; 901/41; 901/50; 901/30
[58] Field of Search ........................ 901/22, 50, 41, 42, 901/30; 285/137.1, 24, 27; 339/112 L, 117 R; 279/16; 408/239 R, 239 A; 409/234; 82/36 R; 219/137.63

[56] References Cited

U.S. PATENT DOCUMENTS

| | | | |
|---|---|---|---|
| 2,290,403 | 7/1942 | Wyss | 285/27 X |
| 2,475,385 | 7/1949 | Frisco | 279/16 |
| 2,475,386 | 7/1949 | Frisco | 279/16 |
| 3,229,656 | 1/1966 | Bodey | 901/22 X |
| 3,295,868 | 1/1967 | Bac | 285/27 |
| 4,270,824 | 6/1981 | Erickson | 339/268 S X |
| 4,274,314 | 6/1981 | Kepinski | 82/36 R |
| 4,439,075 | 3/1984 | Wiederkehr | 279/16 X |

FOREIGN PATENT DOCUMENTS

| | | |
|---|---|---|
| 0043153 | 1/1982 | European Pat. Off. . |
| 0092967 | 11/1983 | European Pat. Off. . |
| 3310070 | 10/1984 | Fed. Rep. of Germany . |

Primary Examiner—Robert J. Spar
Assistant Examiner—Jay J. Alexander
Attorney, Agent, or Firm—McGlew and Tuttle

[57] ABSTRACT

The invention concerns a manipulator (1) which is able to automatically receive the tool holder (7), to clamp it and to set it down again, in order thus to make possible a rapid changing of different tools. For this purpose, the last drive element (6) of the manipulator (1) as well as the tool holder (7) are provided with coupling parts (8,9) and with cooperating screw systems (16,17). The manipulator-side screw system (17) is mounted via an operating element (11) for rotation at a second operating element (10) which forms a rotation barrier (13) with the tool holder (7) as the coupling parts (8,9) come together. The screwing process is actuated by rotation of the last drive member (6). The two operating elements (10,11) are furthermore non-rotationally connected through a fixing mechanism (20). This rotation lock is abolished as soon as the rotation barrier (13) between the operating part (10) and the tool holder (7) becomes effective. In this manner it is possible during the screwing process to connect connectors (24) present at the operating part (10) with connector counterpieces (25) provided at the tool holder (7) in order to automatically achieve a transfer of energy, cooling and/or pressure medium.

16 Claims, 5 Drawing Figures ment carrying the connectors engages into the tool holder and thus forms a rotation barrier. The operating element containing the screw system, however, can rotate under the drive of the last drive member and perform the screwing process, because it is mounted rotatably at the fixed operating element. But this relative rotational movement of the two operating elements is to be possible only when tool change takes place by screwing. Otherwise, in particular when the manipulator with or without tool is being moved, the two operating elements must be non-rotational relative to each other For this purpose the invention provides a fixing mechanism between the two operating elements which is actuated by pressure and which is released only when the screwing process during tool change is being carried out and one operating element is nonrotationally fixed to the tool holder.

DEVICE FOR THE AUTOMATIC GRIPPING AND RELEASING OF A TOOL HOLDER IN A MANIPULATOR

BACKGROUND OF THE INVENTION

The invention relates to a device for the automatic gripping and releasing of a tool holder by the last drive member of a multi-axial manipulator, where the last drive member and the tool holder carry coupling parts to be screwed to each other, and where the rotary drive of the last drive member is provided as an energy source for the screwing together of the two coupling parts readied for engagement by control of the manipulator.

A device with these features has become known through FR-PS No. 2,426,548. To a manipulator several tools are to be assigned, which it is to be possible to change quickly and automatically. The coupling elements here used are constructed in the manner of a bayonet closure, the pitch of the thread spirals being relatively small. This means that the two coupling parts are brought together almost to the final clamping position, with interengagement of the screw systems of the coupling parts. When the rotation drive of the last drive part of the manipulator is actuated, the bayonet closure parts engage one in the other, locking the coupling parts.

The known changing device presupposes that the connections for the transfer of energy, cooling medium, pressure medium or the like between manipulator and tool holder must be coupled manually afterward.

The invention, therefore, sets itself the task to develop a device for the automatic changing of the tool holders in manipulators which permits simultaneously with the changing process an automatic separating or connecting of these connectors for energy, cooling medium, pressure medium and the like, but provision must be made that the closing pressure required for the joining of the parts need not be supplied by the manipulator through its drive members with the exception of the last (rotation drive)

SUMMARY OF THE INVENTION

According to the invention, this problem is solved in that the coupling part connected with the last drive member consists of two operating elements concentrically mounted one on the other, of which one forms a rotation barrier with the coupling part present at the tool holder as the coupling parts come together, and the other operating element has the screw system, the two operating elements being connected together via a fixing mechanism releasable under the action of the rotation barrier.

This arrangement according to the invention makes it possible to provide the connectors required for the transfer of energy, cooling medium, pressure medium or the like at opposite points of the tool holder on the one hand, and, on the other hand, of the operating element fixed during screwing. A prerequisite of this is, however, that in contrast to the prior art screw systems are used which have a relatively small twist angle and a relatively high pitch, so that in the screwing process the two coupling parts converge by a considerable amount, e.g. 18 to 24 mm. In this manner, the stroke required for joining the individual connectors is produced. For this stroke, the connectors must be secured against rotation. This is achieved according to the invention in that during approach of the coupling parts, the operating ele- The advantage of this rotation barrier and of the fixing mechanism is that combined with a compact design the required operation can be carried out securely.

With claims 6 to 8 advantageous realizations of the screw system are placed under protection, by means of which it is possible, without exerting any special contact pressure on the part of the manipulator, to overcome a considerable approach path by screwing over a small twist angle and to fix the joined parts in the closed position self-lockingly. In the known construction, the self-lock is attainble by the small pitch of the bayonet turns. The subject of the invention does not permit such a selflock because the screw turns are especially steep and hence do not bring about a selflocking effect. For this reason, the screwing process is continued until the screw elements come to abut on a plane perpendicular to the axis of rotation, where optionally also a depression can lead to the fixing of the position reached.

Claim 9 represents an appropriate structural embodiment with which it is possible to functionally connect the elements for the screw system with the elements for the fixing mechanism.

Claim 10 offers the condition for interconnecting the connectors for energy, cooling medium, pressure medium and the like simultaneously with the tool change, it being assured that these connectors are actually opposite each other in the screwing process.

Claim 11 contains an advantageous form of realization for centering the parts to be joined together, while claim 12 indicates how the subject of the invention can be connected with the last drive member of the manipulator via a disconnect protection. The special geometric form of this disconnect protection is the subject of another invention (P 34 18 720.0). Claim 13 ensures that the necessary closing pressure of the coupling parts is exerted without overstressing the screw systems and provides for slack equalization. With the subject of claim 14, lastly, the conditions for reaching a defined closing end position of the coupling parts are established.

Details of the invention are illustrated in the drawing schematically and by way of example.

BRIEF DESCRIPTION OF THE DRAWINGS

FIG. 1 is to show schematically the location of the subject of the invention for better comprehension of the other figures. According to it, in a manipulator 1 of any model it is provided that the last drive member 6 thereof can automatically receive and set down the tool holder 7, so that the manipulator 1 is able to carry out an automatic change between several such tool holders 7. Customarily the manipulator 1 contains several axes, which enable it to approach any point within its sphere of action on a given path. In the example of FIG. 1 the manipulator 1 comprises a pedestal 2, on which a rotary part 3 is guided about a vertical axis. At this rotary part 3 is a swivel part 4, and at the latter a swivel part 5, both being mounted for rotation about horizontal axes. Also the last drive member 6 is mounted for rotation about horizontal axes. Also the last drive member 6 is mounted to pivot about such an axis at the swivel part 5. Naturally one or another of the structural parts of the manipulator 1 may be economized or designed in a different manner.

Figure 1:
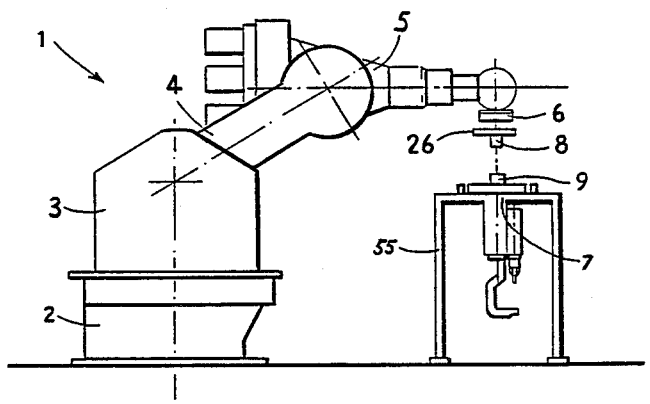
FIG. 1 shows a schematic representaion of a manipulator with a device for the automatic changing of the tool.

What is essential is that the last drive member 6 comprises a flange 26, on which the tool holder 7 is secured as usual.

In the present case, the attachment of the tool holder 7 is effected by means of coupling parts 8, 9 which, when brought together between the tool holder 7 and the last drive member 6, engage one in the other and bring about a firm connection of the tool holder 7 with the last drive member 6. The several axes of the manipulator 1 make it possible to bring the coupling parts 8, 9 into a concentric position.

For these coupling parts 8, 9 the condition further exists that the closing pressure for attaching the tool holder 7 must not be exerted by the parts 2 to 5 of the manipulator 1. Only the rotary movement, possible in the usual manner in the last drive member 6, is to exert this closing pressure, so that only the torque of the drive motor required for this is applied.

Figure 2:
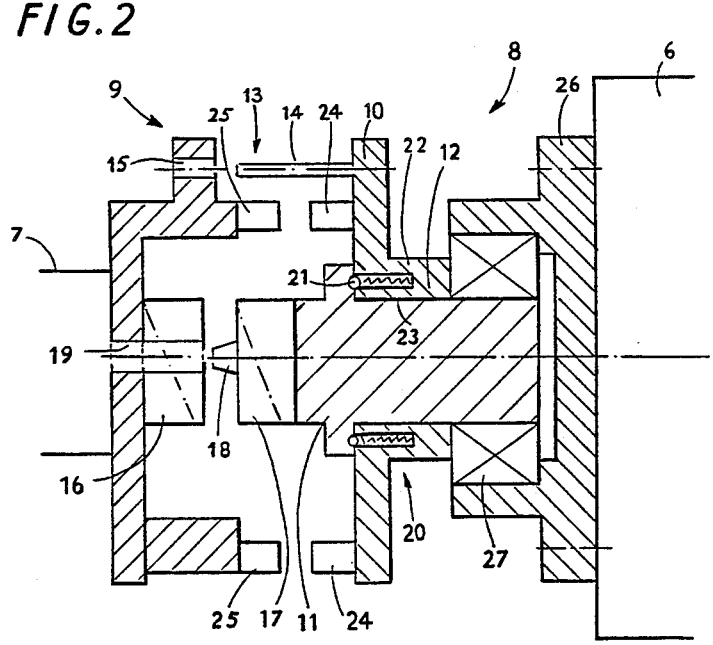
FIG. 2, a section through a basic sketch of the tool change device.

FIG. 2 is a symbolic representation of the principle of solution of the invention. By 8 and 9 are represented the two coupling parts in a position spaced from each other, each coupling part 8, 9 having a screw system 16, 17, respectively. As the coupling parts 8, 9 come together, a centering pin 18 first engages in a matching bore 19, whereupon the two screw systems 16, 17 are brought into a position ready for engagement. The coupling part 8 connected with the last drive member 6 is to transmit the rotation of the last drive member 5 to the screw system 17, which under engagement with the associated screw system 16 at the coupling part 9 brings about the approach of the two parts until the closing position is reached.

In the subject of FIG. 2 it is assumed, however, that the coupling parts 8, 9 are provided with a connector 24 and a connector counterpiece 25, whose function it is to automatically establish a connection for the transfer of energy, cooling medium, pressure medium and the like from the manipulator 1 to the tool holder 7 during the tool change. While these connectors 24, 25 come into engagement with one another, no relative rotation must occur between the coupling parts 8, 9. This is actually in contradiction to the basic idea of bringing about the approach of the coupling parts 8, 9 through screw systems or first and second rotational connectors 16, 17.

To solve this problem, the coupling part 8, which is connected with the last drive member 6 of the manipulator 1, is divided into two operating elements 10, 11, which are mounted one on the other at 12. A fixing mechanism 20 has the task of connecting these two operating elements 10, 11 in a normally non-rotational manner. By the last drive member 6, in fact, only the operating element 11 is driven. But for normal operation it is also necessary that the operating element 10 must execute the same movement as the operating element 11. In the symbolic example of FIG. 2, the fixing mechanism 20 consists in the usual manner of balls 21 pressurized by springs 23 which are contained in bores 22. In this manner, a rotation lock is brought about between the operating elements 10, 11, but which is cancelled when a certain torque is overcome, in that the balls 21 give way into the bores 22 counter to the action of the springs 23.

The operating element 10 has a rotation barrier 13, which serves to bring about, as the coupling parts 8, 9 approach, a non-rotational union between coupling part 9 and operating element 10. In the embodiment this barrier 13 consists of a centering pin 14 which engages in a matching cutout 15 of coupling part 9 before the screw systems 16, 17 can interact.

The tool holder 7 is set down with its coupling part 9 at a frame 55 or the like in a position secured against rotation (FIG. 1).

Figure 4:
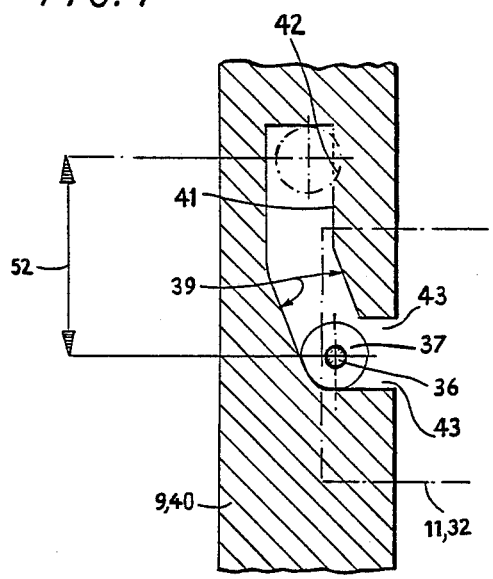
FIG. 4, a partial section (development) along line IV—IV through the screw system in FIG. 3.

From this arrangement the following operation results:

First the manipulator 1 is brought with its last drive member 6 into a coaxial position to the tool holder 7. In this coaxial position according to FIG. 1 and 2, the last drive member 6 is moved along this axis toward the tool holder 7, whereupon first the rotation barrier 13 becomes active by engagement of the centering pin 14 into the cutout 15. At the same time the screw systems 16, 17 have thereby been brought into a position ready for screwing. This position corresponds in FIG. 4 to the position of the screwing element 37 in the run-in slit 43 of the hub 40. By programming it can be assured that the coaxial position of the rotation barrier 13 is found if the centering pin 14 should not register with the cutout 15 as the parts 8, 9 approach.

After completed centering, the flange 26 of the last drive member 6 can be set in rotation. Through the rotary movement of flange 26 the operating element 11 with the screw system 17 is brought into rotation. The centering pin 18 engages into the centering bore 19 and ensures the concentric position of the parts.

When the rotation barrier 13 is effective, the mutual engagement of the screw systems 16, 17 is unable to bring about the rotational displacement of the operating element 10, since the latter is retained fixed relative to the tool holder 7 by the rotation barrier 13, the tool holder 7 being braced against the frame 55 or the like non-rotationally. But while the coupling parts 8, 9 come together by meshing of the screw systems 16, 17, the connectors 24, 25 can thus interengage beause they are no longer rotationally moved relative to each other. By the action of the rotation barrier 13 the fixing mechanism or clutch 20 releases, because the torque introduced into the operating element 11 by the last drive member 6 causes the balls 21 to give way into the bores 22 counter to the action of the springs 23 while the operating element 10 is stationary.

In FIG. 2 is shown further, symbolically, a disconnect protection 27 which connects flange 26 with the operating element 11. This disconnect protection, which is the subject of another invention, but may also be designed according to prior art, provides that the drive of the manipulator 1 is disconnected as soon as the tool or the tool holder 7 strikes against an undesired obstacle ("resistance").

Figure 3:
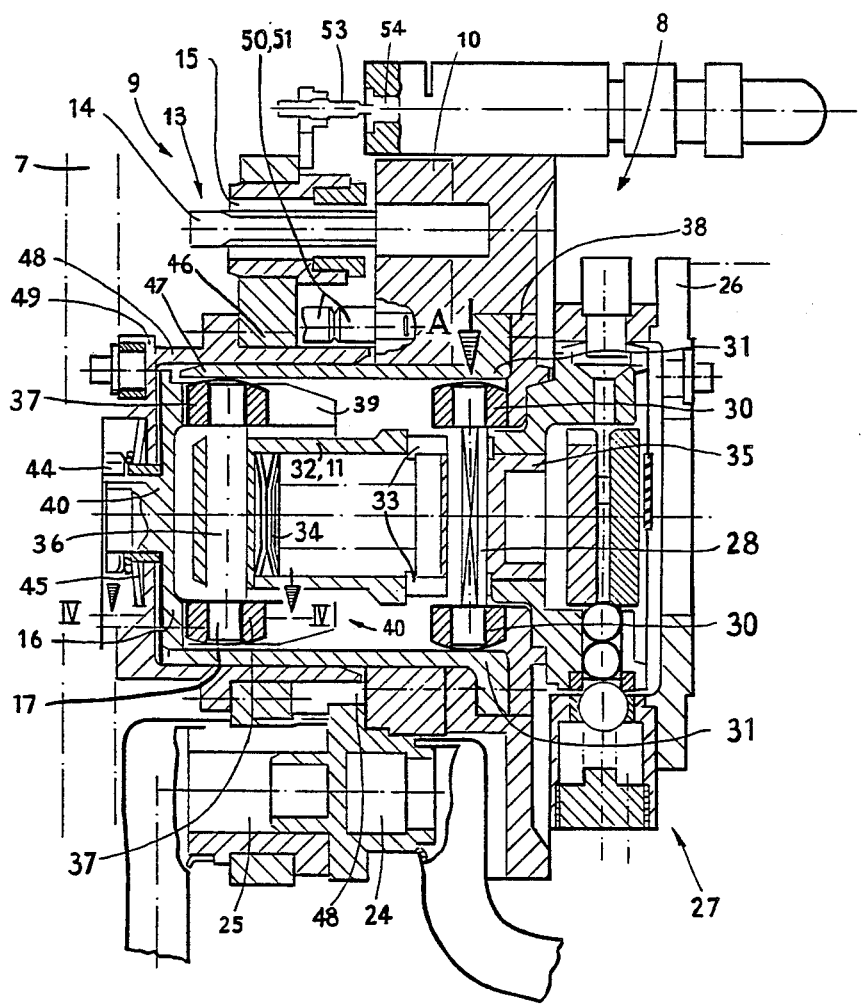
FIG. 3, a transverse section through a design variant of the tool change device.

FIG. 3 shows an embodiment of the principle of invention illustrated in FIG. 2. The structurally illustrated disconnect protection 27 is not described because it is the subject of another invention (P 34 18 720.). Alternatively, another disconnect protection may be employed in its place.

In the example of FIG. 3 it is assumed that the flange 26 drives via the disconnect protection 27 onto a hollow shaft 32, whichis an essential component of the operating element 11 (FIG. 2). In this hollow shaft 32, a bolt 28 is disposed radially to the axis of rotation, the bolt having at its ends two rollers 30 as fixing elements. These rollers 30 normally engage in grooves 31 present at the end face on a flanged plate 38 of the other operating element 10. Bolt 28 is mounted in a guideway formed as a piston 35. This piston 35 or respectively the bolt 28 are pressurized by a spring 34 which is disposed inside the hollow shaft 32 and is braced against an end wall. In this hollow shaft 32 the bolt 28 is guided for axial movement along a slit type guideway 33 (slot). When the operating element 10 is retained non-rotationally, whereas the operating element 11 is rotationally driven with its hollow shaft 32, then the individual roller 30 disengages from the groove 31 and permits a relative rotational movement of the operating elements 10, 11. In the engaged position, however, the individual roller 30 provides for a rotation lock of the operating elements 10, 11 with a spring constant adjusted so that its release requires less force than the reaction of the disconnect protection 27.

With the same hollow shaft 32 is connected a bolt 36 protruding through it radially, which bolt carries at its ends rollers 37 as screwing elements. These screwing elements 37 engage into screw turn sections 39 of the screw system 16, there being provided according to FIG. 4 an axis-parallel run-in slit 43, to which the turn section 39 is contiguous with great pitch. This great pitch, which comprises for example 18 to 24 mm (seen axially), is to ensure the axial movement of the connectors 24, 25 up to the end position with utilization of a small twist angle 52.

It is advisable to provide at the end of the turn section 39 a surface section 41 extending radially to the axis of rotation, against which (41) the screwing element 37 applies when the end position of the coupling parts 8, 9 is reached. Thus a self-lock is ensured, but which can moreover be intensified by providing in the radial surface section 41 a depression 42 for each screwing element 37, which acts like a locking mechanism.

In the sense of the embodiment of FIG. 3, the screw system 17 is designed in the form of a hub 40, into the cavity of which the hollow shaft 32 protrudes with the bolt 36. This hub 40 is connected through a screw unuion 44 and a spring 45 with a flange 49 secured on the tool holder 7. It is thus ensured that the hub 40 has a certain axial play relative to flange 49 or tool holder 7 counter to the action of spring 45. This spring 45 is—with reference to FIG. 4—at the same time the equalizing element for equalizing the axial motion difference upon engagement of the screwing element 37 into the depression 42.

In addition, the tensioned spring 45 equalizes impulses occurring when the screw systems 16, 17 or the coupling parts 8, 9 strike against one another.

In the embodiment of FIG. 3, the centering of the coupling parts 8, 9 is brought about by hollow-cylindrical walls 46, 47 of the coupling parts 8, 9 with bevels 48 at the end face thereof to facilitate the sliding one into the other.

The tool-side coupling part 9 and the non-rotationally fixed operating element 10 of the other coupling part 8 each comprise three stop pins 50, 51, which in the closing end position of the coupling parts 8, 9 strike against each other and form a defined radial closing plane.

This closing end position of the coupling parts 8, 9 is signaled by approach of an adjustable switching pin 53 to an electric switch 54, in order to initiate the further work cycles by a master control.

Figure 5:
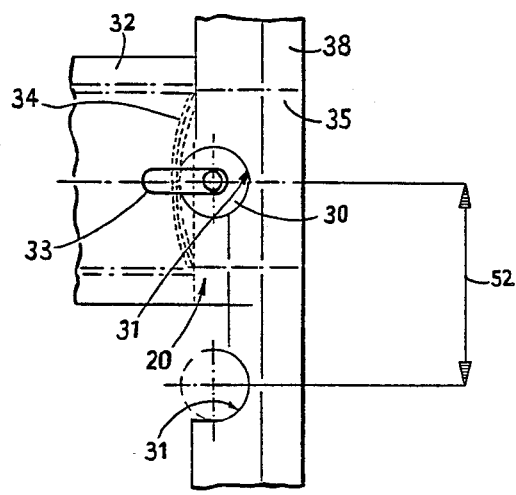
FIG. 5, a plan view (development) of the fixing mechanism corresponding to the arrow A in FIG. 3.

FIG. 5 shows in a development the fixing mechanism 20 of FIG. 3. According to it, the roller 30 engages at the given twist angle 52 in both end positions into grooves 31, the engagement position being secured by the force of spring 34.

Another variant of the fixing mechanism 20, not shown in the drawing, may contain at least one pneumatically switched bolt, which interlocks the two operating elements 10, 11 in operating or coupling position and is brought into an unlocked position during the screwing process.

We claim:

1. A coupling arrangement for the automatic gripping and releasing of a tool for use with a last drive member of a multi-axial manipulator, the last drive member having an axis of rotation, the coupling arrangement comprising: a first coupling part,operatively connected to the last drive member, having a first operating element and a second operating element, each of the first and second operating elements having an axis of rotation coincident with the axis of rotation of the last drive member, said first operating element being concentrically mounted on said second operating element; a second coupling part, connected to the tool, a rotational connector, having a first rotational connector part associated with said second operating element and a second rotational connector part connected with said second coupling part; rotational barrier means, associated with said first operating element and engageable with said second coupling part, for preventing relative rotation between said first operating element and said second coupling part; clutch means for fixing said first operating element relative to said second operating element and for releasing said first operating element relative to said second operating element when said rotational barrier means acts to prevent said first operating element from rotating relative to said second coupling part, thereby allowing said first rotational connector part to rotate, upon rotation of the last drive member and said second operating element, to allow engagement of said first and second rotational connector part, while said rotation barrier means prevents relative rotation between said first operating element and said second coupling part and said drive member acts as energy source to rotate together the two coupling parts.

2. The coupling arrangement according to claim 1, wherein, said rotation barrier means includes at least one centering pin connected with said first operating element and engageable with a matching cut-out, associated with said second coupling part.

3. The coupling arrangement according to claim 1, wherein: said second operating element is connected to said first rotational connector part which has a radially extending bolt with a fixing element present thereon engageable into a matching counterfixing element, of the first operating element under the axially acting spring force of a spring.

4. The coupling arrangement according to claim 3, wherein: said fixing element including rollers rotatably mounted on said extending bolt, and said counterfixing element including radially extending grooves defined by a flange plate.

5. The coupling arrangement according to claim 4, wherein: said bolt and said guide are pressured by said axially acting spring having a base which is supported on said rotational connector.

6. The coupling arrangement according to claim 1, wherein: said rotational connector including at least one screw turn section of a great pitch and a small twist angle.

7. The coupling arrangement according to claim 6, wherein: said screw turn section changes over into a surface section extending substantially radially to the axis of rotation, in which a depression, for the snapping-in of the rotational connector engaging in the screw turn section, may be provided.

8. The coupling arrangement according to claim 7, wherein: said second rotational connector part includes a hub with a screw turn section cut into the wall of said hub; and, a plurality of screwing element rollers mounted for rotation at ends of a radially extending bolt associated with said first rotational connector part.

9. The coupling arrangement according to claim 1, wherein: said first rotational connector part associated with said second operating element, including a hollow shaft having a plurality of bolts which radially traverse the hollow shaft and guide a fixing element and a screwing element associated with said plurality of bolts, a first bolt of said plurality of bolts acting with said fixing element being guided so as to be axially movable in said hollow shaft and biased by a spring disposed in said hollow shaft.

10. The coupling arrangement according to claim 1, further comprising: connector means for the transfer of energy, cooling medium and/or pressure medium to the tool, positioned at said first operating element; and, counterconnector means for receiving the transfer of energy, cooling medium and/or pressure medium, being arranged on said second operating element in coincidence with the opposite said connectors.

11. The coupling arrangement according to claim 1, wherein: said first operating element and said second coupling part each having hollow cylindrical walls projecting toward each other, and having end face bevels which act to center a first operating element relative to said second coupling part.

12. The coupling arrangement according to claim 1, wherein: said second operating element associated with said first rotational connector part, having means for protecting against disconnection, arranged at an output flange connected to the last drive member.

13. The coupling arrangement according to claim 1, wherein: said second rotational connector part having a hub which is guided by a flange connected with the tool so as to guide said hub so as to be non-rotationally but axially movable and to be axially braced by a spring.

14. The coupling arrangement according to claim 1, wherein: said second coupling part and said first operating element each having three stop pins respectively facing the other, thereby defining a closing end position of said first and second coupling parts.

15. The coupling arrangement for the automatic gripping and releasing of a tool for use with a last drive member of a multi-axial manipulator, the last drive member having an axis of rotation, the coupling arrangement comprising: a first coupling part, operatively connected to the last drive member having a first operating element and a second operating element, each of said first and second operating elements having an axis of rotation coincident with the axis of rotation of the last drive member, said first operating element being concentrically mounted on said second operating element; a second coupling part, connected to the tool, and comprising a rotational connector having a first rotational connector part with a radially extending bolt, a fixing element associated with said radially extending bolt, and spring means for acting on said radially extending bolt in an axial direction to bias said radially extending bolt and said fixing element into engagement with a matching counter-fixing element associated with said first operating element, a second rotational connector part, associated with said second coupling part, rotation barrier means, associated with said first operating element, and engageable with said second coupling part, for preventing relative rotation between said first operating element and said second coupling part; clutch means for fixing said first operating element relative to said second operating element and for releasing said first operating element relative to said second operating element when said rotation barrier means acts to prevent said first operating element from rotating relative to said second coupling part, thereby allowing said first rotational connector part to rotate, upon rotation of said last drive member, and second operating element, to allow engagement of said first and second rotational connector parts while said rotation barrier means prevents relative rotation between said first and second operating elements.

16. The coupling arrangement according to claim 15, wherein: said fixing element, associated with said radially extending bolt, including rollers rotatably mounted on said bolt; and said counter-fixing element including radially extending grooves defined by a flange plate associated with said first operating element.

* * * * *